United States Patent [19]

Gauger

[11] Patent Number: 4,980,069

[45] Date of Patent: Dec. 25, 1990

[54] PROCESS FOR PRODUCTION OF A SEMI-PERMEABLE MEMBRANE, A MEMBRANE MANUFACTURED BY SAID PROCESS AND THE USE OF SUCH A MEMBRANE FOR GAS OR LIQUID SEPARATION

[76] Inventor: Jürgen F. Gauger, 34 Ch.Des Mesanges, Geneva, Switzerland, CH-1226

[21] Appl. No.: 326,666

[22] PCT Filed: Jun. 25, 1987

[86] PCT No.: PCT/SE87/00298

§ 371 Date: Feb. 27, 1989

§ 102(e) Date: Feb. 27, 1989

[87] PCT Pub. No.: WO88/10141

PCT Pub. Date: Dec. 29, 1988

[51] Int. Cl.$^5$ ............................................. B01D 69/00
[52] U.S. Cl. ..................................... 210/651; 210/490; 427/245
[58] Field of Search ................... 55/16, 158; 210/650, 210/651, 652, 500.13, 490; 427/244, 245, 246

[56] References Cited

U.S. PATENT DOCUMENTS

| | | | |
|---|---|---|---|
| 3,615,024 | 10/1971 | Michaels | 210/490 |
| 3,912,834 | 10/1975 | Imai et al. | 210/490 X |
| 4,014,798 | 3/1977 | Rembaum | 210/500.23 |
| 4,045,352 | 8/1977 | Rembaum et al. | 210/500.23 |
| 4,230,463 | 10/1980 | Henis et al. | 55/73 X |

FOREIGN PATENT DOCUMENTS

| | | |
|---|---|---|
| 14054 | 8/1980 | European Pat. Off. |
| 87955 | 9/1983 | European Pat. Off. |
| 209935 | 1/1987 | European Pat. Off. |

*Primary Examiner*—Frank Spear
*Attorney, Agent, or Firm*—Eric Y. Munson

[57] ABSTRACT

A porous support material is selected having a relatively narrow pore size distribution. During a certain time one side of said support material is then exposed to a first chemical reaction partner. The other side of the support material is at the same time exposed to a second chemical reaction partner. In the penetrating pores or channels a chemical reaction takes place in a boundary region between the two reaction partners forming selectively occlusions blocking said pores and channels.

24 Claims, No Drawings

PROCESS FOR PRODUCTION OF A SEMI-PERMEABLE MEMBRANE, A MEMBRANE MANUFACTURED BY SAID PROCESS AND THE USE OF SUCH A MEMBRANE FOR GAS OR LIQUID SEPARATION

TECHNICAL FIELD

The present invention pertains to a process for the production of a semi-permeable membrane, a membrane manufactured by said process and the use of such a membrane for gas or liquid separation.

BACKGROUND ART

Membrane separation processes for the separation of liquids and substances dissolved in liquids and for gases have become very important in recent years and are replacing more and more conventional separation technologies.

The performance of the separations achieved is depending in the first place on the membrane material and the membrane thickness.

Since the flux rate of a membrane is inverse proportional to the thickness of the membrane, the membrane has to be very thin in order to achieve flux rates high enough for practical applications. Large surface areas of very thin membranes are difficult to produce and to handle, therefore they have to be supported by a porous media providing mechanical strength without reducing noticeably the membrane performance ("composite membrane").

A method to produce high-flux membranes has been invented by Loeb et al, US-A-3,133,132. This method in asymmetrical membranes having a very thin tight surface layer supported by a spongy sub-structure of the same polymer material. This type of membranes is used today in large-scale separation systems for liquid media, e.g. in connection with water desalination by reverse osmosis. The original asymmetrical Loeb membranes were made from cellulose acetates and cellulose acetobutyrates and show a relatively small number of defects like so called pinholes. The Loeb process has also been applied to other polymers. However, it has been found that large and costly experimental programs had to be carried out before acceptable asymmetrical membranes could be obtained from non-cellulosic polymers. In addition, these membranes have quite generally more pinholes and other penetrating surface defects than those prepared from cellulose acetate.

Despite the larger number of pinholes, asymmetrical membranes made from non-cellulosic polymers have been applied successfully to separations in liquid systems, since the relatively high viscosity and high cohesive properties of liquids, as well as adsorption on and swelling of the membranes, limit the negative effects of pinholes.

For gas separations, however, pinholes in membranes present a much more severe problem since the gas transport through these holes is five to six orders of magnitude ($10^5$–$10^6$) higher than the transport through the membrane material. This is due to the low absorption and the very low viscosity and cohesive properties of gases.

A very important difference between liquid and gases is also the generally much lower solubility of the gases in the membrane polymer.

MONSANTO company, St. Louis, Mo., USA, describes US-A-4,230,463 multicomponent membranes for gas separations comprising a coating in contact with a porous separation membrane wherein the separation properties of the multicomponent, or composite, membrane is principally determined by the porous separation membrane as opposed to the material of the coating. This is achieved by choosing a coating material, e.g. polysiloxanes which exhibits less resistance to permeate gas flow than the porous support material, e.g. polysulfone. The support material, however, has a better separation factor and therefore determines the efficiency of the gas separation. Since the support has also a higher resistance to the gas flow, it practically also determines the flux rate. The beneficial effect of the coating is therefore mainly the occlusion of the pinholes and the protection of the polysulfone membrane against damages during handling and assembly in modules.

Large-scale gas separation systems based on asymmetrical hollow fibre composite membranes as described in US-A-4,230,463, have been developed by MONSANTO and commercially applied to different gas separations.

The company DOW CHEMICALS has developed symmetrical hollow fibre membranes based preferentially on polymethylpentene. Due to the extremely high gas permeability of this polymer, flux rates high enough for practical applications are obtained despite the symmetrical nature of the membrane. Since the thickness of this unsupported symmetrical membrane had to be reduced as much as possible while preventing a membrane collaps due to the pressure difference applied to the hollow fibres during operation of the membrane modules, hollow fibres with an extremely small diameter, i.e. less than a human hair, resulted from DOW's development.

DOW is commercialising their gas separation membrane in form of their GENERON modules and systems for air separation used for production of 90–98% nitrogen gas or oxygen enriched air.

BRIEF DISCLOSURE OF THE INVENTION

One object of the present invention is to provide a process for the production of a semi-permeable membrane which is practically free from penetrating defects like pinholes, microfissures and so on. The separation properties of the resulting membrane is therefore considerably improved compared to existing membranes.

This performance improvement is especially important for gas separation membranes, since even a relatively small number of penetrating pores can affect the selective separation in a very detrimental way.

Another advantage is that the effective thickness of the membrane, which according to the above is one of the parameters determining the performance, can easily be controlled in the manufacturing process by the control of the reaction parameters like time and temperature.

The properties of commercially available ultrafiltration or microfiltration membranes, or pre-assembled modules of such membranes, could be amended in a very favourable way by means of the inventive process in using said membranes as supports (cf. below) for a membrane according to the invention. Membranes according to the invention can also be optimised for different operation pressure. A 0.1 micron thick membrane, for instance, formed in situ in a porous UF-membrane with 100 Å average pore diameter as support would, once formed tolerate a higher operation pressure than a membrane of the same thickness formed in the pores of a microfilter with for instance 10 micron pore diameter.

The process and the membrane is thereby characterised according to the enclosed claims.

Other objects and advantages will be apparent from the following description.

DESCRIPTION

The general idea underlaying the inventive process is based on the already known fact that for instance two different monomers like a diamine, or a diol and a bifunctional acid chloride dissolved in two non-miscible solvents can react at the phase boundary of the solvents and form a polymer film, e.g. of a polyamide (phase boundary polycondensation).

The inventive process comprises two main steps, selecting a porous support material and subsequently occluding selectively the penetrating channels or pores of said material by means of a polymer which is produced in one of a plurality of ways.

Suitable supports, among which the selection could be made, are for instance so called mircoporous materials like ultrafiltration membranes and microfilters. The material in such ultrafiltration membranes could for instance be cellulose acetate, cellulose nitrate, aliphatic or aromatic polyamides or polyurethanes. The pore size for such membranes is typically between 50 Å and 0.1 micron. The microfilters are typically made from polyvinilydene fluoride, polyamides, cellulose derivatives, polypropylene or other synthetic polymers. The pore size for the microfilters is typically between 0.1 micron and about 20 micron. These supports are highly porous. The pore volume can be higher than 50% and is in some cases in the order of 80 to 90%. Despite the high pore volumes the pore size distribution of these microporous support materials is normally very narrow which is a distinct advantage for the formation of composite membranes according to this invention. Other possible support material could be different types of nonwoven felt-or filter type supports made from polypropylene, polyamides or other polymers. The pore size would in this case be about 10 to 100 micron. The pore size distribution can be fairly large for this support which might be disadvantageous in certain connections. The pore volume is typically between 30 and 60%.

In forming the occlusions the porous support material is on the one side exposed to a first appropriate liquid solution or gas and on the other side to a second appropriate liquid solution or gas during a certain time. The solutions or gases will react in a boundary region in the penetrating channels or pores forming the occlusions blocking those channels. The concentration of the reacting gases might be controlled by dilution with other gases.

The narrow pore size distribution allows to bring a liquid reaction partner, or a solid or gaseous reaction partner dissolved in a liquid, in a close contact with one side of the support material by applying a pressure on said reaction partner. Depending on the viscosity and surface tension of the liquid reaction partner on one hand and the average pore size and wettability of the support material on the other hand, the meniscus of the liquid reaction partner can be displaced more or less within the penetrating channels or pores depending on the applied pressure. This allows to determine the most favourable reaction zone for the formation of the semipermeable membrane within the pores, leading to composite membranes of optimised mechanical strength.

It is here emphasized that the polymer is not forming a continuous coating of the support material. The occluding polymer film is only produced inside the porous material in the penetrating channels.

The separation properties of the resulting membrane is mainly depending on the permeability characteristics of the membrane polymer formed in situ in the pores, on the thickness of the membrane layers formed within the pores of the support and on the pore volume of the support, which determines the effective membrane surface after the reaction.

In forming the occlusions for example, one of the solutions could be a primary or secondary diamine of the general formula $HR_1N-R_2-NR_3H$ (with $R_1$ and $R_3 = H$, aliphatic rest or aromatic rest and $R_2$ = aliphatic or aromatic rest).

A bifunctional acid chloride of the general formula $ClOC-R_4-COCl$ ($R_4$ = aliphatic or aromatic rest) is dissolved in a solvent non-miscible with water, e.g. in chloroform, and this solution is brought in contact with the other side of the support material. In regions of penetrating channels the two non-miscible phases will enter in contact and a polymer film is formed at the interface occluding the hole:

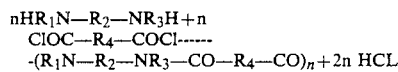

The evolving HCl can be bound by a non-condensible basic compound like pyridine.

Since the diffusion of the monomers through the support material is very slow as compared to the fast reaction kinetic of the polycondensation, the forming of the occlusions can be terminated before a noticeable reaction can take place at the exposed areas of the support material.

In general the monomers or other active components should be selected in such way that undesirable side reactions with the support material are avoided.

After termination of the reaction, the surface of the membrane wetted by the aqueous solution of the diamine (or diol) is washed with water or a water miscible solvent and the surface of the membrane wetted by the chlcroform solution of the bifunctional acid chloride is washed with chloroform or another solvent miscible with chloroform in order to remove the surplus monomers.

The process described in this application can also be advantageous achieved in pre-assembled membrane modules. In the example above solutions of the monomers are filled in the connecting pipes leading to the opposite sides of the prefabricated support membrane. For instance, in the case of a hollow fibre module one of the solutions is filled in the pipe connection leading to the hollow fibre cores, the second solution is filled in the module part surrounding the hollow fibre bundle.

Another embodiment of the invention is a method based on catalyst initiated polymerisation.

A solution containing a monomer or prepolymer, e.g. a compound with a polymerisable double bound, is brought in contact with one side of the support material. The other side of the support material is brought in contact with a solution non-miscible with the first one and contains an initiator for the polymerisation reaction, e.g. and azo-compound like azobisisobutyronitril or a perester, peracid or peroxide like benzoylperoxide. The polymerisation reaction is initialised in the penetrating channels by diffusion of the catalyst into the solution containing the monomer. The resulting locally initiated polymerisation reaction leads to the formation of a polymer film occluding the penetrating channel. In order to avoid that the polymerisation goes beyond the channel areas due to the chain reaction of the polymerisation process substances terminating the chain reaction, i.e. regulators, can be added in appropriate concentrations.

As a further alternative it is possible to apply one reaction partner i.e. either the monomer or the initiator, in gas or vapour form. In this case a monomer or initiator with a high enough vapour pressure is chosen or the process is achieved at increased temperature and the support material is contacted at one side with a liquid phase containing one reaction partner and with a gas phase at the other surface containing the complementary reaction partner, i.e. either the monomer or the initiator in vapour form or in the gas state. The vapour or gas can be applied undiluted or diluted with an inert gas stream (e.g. nitrogen). In some cases, e.g. in case where the surface is not very hydrophilic, it can also be of advantage to reduce the overall gas pressure in order to get a certain penetration of the liquid phase into the channels. The same effect can be achieved by applying a pressure on the liquid contacting one of the membrane surfaces.

It is also possible to apply both reaction partners in the gas state. In this case it is advantageous to impregnate the support material with a liquid before exposing it to the gaseous reaction partners. This helps to limit the reaction zone to the inside of the channels.

A still further alternative is based on cross-linking of polymers.

In this version of the process one solution contains a polymer with functional groups available for cross-linking, and the second solution in contact with the opposite side of the support material contains a cross-linking agent. Examples for the polymers are polyvinylalcohol, polyamins or cellulose derivatives; examples for the cross-linking agent are bifunctional aldehydes (e.g. glutardialdehyd) or bifunctional acid chloride. Cross-linking of the polymer occurs in the contact areas provided by penetrating channels. The cross-linked polymers are insoluble and occlude the channels.

A method based on precipitation of polymers is another advantageous embodiment of the invention. In this method one side of the support material is in contact with a polymer solution and the other side is in contact with a liquid which is a non-solvent or a bad solvent for the polymer. The polymer is precipitated in the channel areas by contact with the non-solvent occluding thus the penetrating channels.

All the alternatives above can be applied to the production of flat membranes as well as membranes in the form of hollow fibres or tubular membranes. Moreover, the method can also be applied to all kinds of pre-fabricated membrane modules e.g. hollow fibre modules, spiral wound membrane modules, tubular modules and filter press types modules.

Besides the ease of operation such a use of the invention gives the additional important advantage that damages occurred during handling, e.g. cutting and potting, of the membranes and during the assembly in modules are also repaired.

I claim:

1. A process for making a semi-permeable membrane characterized in that said process comprises the steps of:
   selecting a porous support material having a relatively narrow pore size distribution, and
   selectively occluding only the penetrating pores or channels of said porous support material with a semi-permeable polymer membrane material formed by a reaction in a boundary region within said channels or pores for blocking said channels or pores with said semi-permeable material.

2. A process according to claim 1
   characterised in that,
   said porous support material is a so called ultrafiltration membrane.

3. A process according to claim 2
   characterized in that,
   ultrafiltration membrane has an average pore size in the interval 50 A to 0.1 micron.

4. A process according to claim 1
   characterized in that,
   said porous support material is a so called microfilter.

5. A process according to claim 4
   characterised in that,
   said microfilter has an average pore size in the interval 0.1 micron to 20 micron.

6. A process according to claim 1
   characterised in that,
   during a certain time
   one side of the support material is exposed to a first chemical reaction partner
   the other side of the support material is exposed to a second chemical raction partner.
   so that in the penetrating pores or channels a chemical reaction will take place in a boundary region between the two reaction partner forming selectively said occlusions blocking said pores or channels.

7. A membrane manufactured by the process of claim 1
   characterised in that,
   it comprises a support material having pores or channels between the two sides of the support material blocked inside the support material by means of occlusions of a polymer film.

8. A process of separating gases or liquids using the membrane of claim 7.

9. A process according to claim 6 characterised in that said first chemical reaction partner is applied in gaseous or vapor form.

10. A process according to claim 6 characterised in that said second chemical reaction partner is applied in liquid form.

11. A process according to claim 9 characterised in that said first reaction partner is a pure gas or pure vapor.

12. A process according to claim 9 characterised in that said first reaction partner is a gas or vapor diluted by another gas.

13. A process according to claim 10 characterised in that said second reaction partner is a liquid.

14. A process according to claim 10 characterised in that said second reaction partner is a liquid diluted by a solvent.

15. A process according to claim 6 characterised in that said second reaction partner is a solid dissolved in a solvent.

16. A process according to claim 6 characterised in that said second reaction partner is a gas dissolved in a solvent.

17. A process according to claim 6 characterised in that one of said reaction partners initially penetrates one side of support material to situate the chemical reaction within said pores or channels.

18. A process according to claim 6 characterised in that both the first and the second reaction partners are in the gaseous form and that the membrane is impregnated with a liquid before the two membrane sides are exposed to the reaction partners.

19. A process according to claim 6 characterised in that said membrane forms part of a preassembled membrane module.

20. A process according to claim 6 characterised in that said chemical reaction is a phase boundary polycondensation.

21. A process according to claim 6 characterised in that said chemical reaction is a catalyst initiated polymerization.

22. A process according to claim 6 characterised in that said chemical reaction is based on further polymerization of prepolymers.

23. A process according to claim 6 characterised in that said chemical reaction is based on cross linking of polymers.

24. A process according to claim 6 characterised in that said chemical reaction is based on the precipitation of a polymer from its solution by a non solvent.

* * * * *